March 13, 1928. 1,662,282
H. G. RITCHEY
VACUUM TANK
Filed Dec. 1, 1922
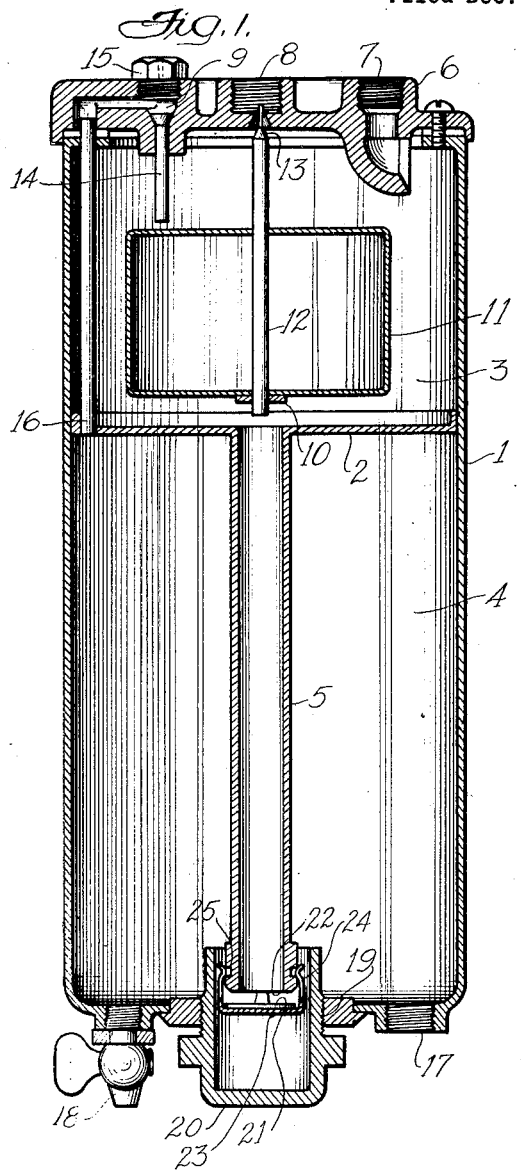
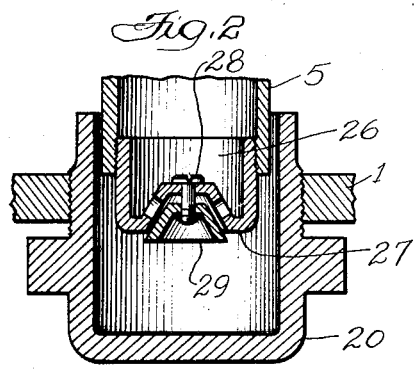
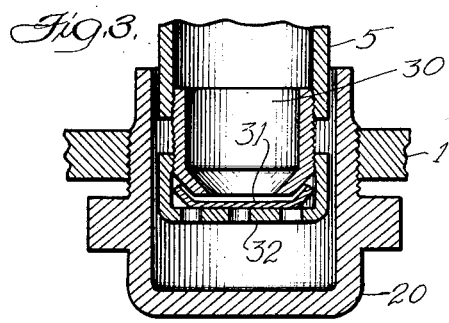
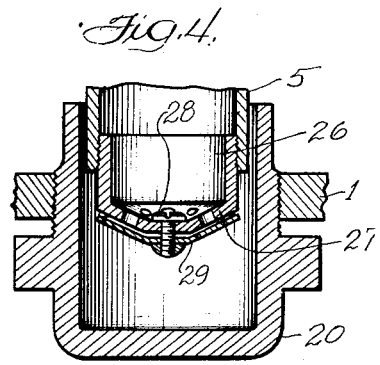
Witnesses:
Inventor:
Harry G. Ritchey,
By Hummler & Hummler,
Attys Patented Mar. 13, 1928.

1,662,282

UNITED STATES PATENT OFFICE.

HARRY G. RITCHEY, OF CHICAGO, ILLINOIS, ASSIGNOR TO SIMPLEX AUTOMOTIVE PRODUCTS COMPANY, OF CHICAGO, ILLINOIS, A CORPORATION OF OREGON.

VACUUM TANK.

Application filed December 1, 1922. Serial No. 604,437.

This invention relates to liquid fuel feeding devices commonly known as vacuum tanks, for controlling the supply of liquid fuel to the carburetor of an internal combustion engine. The invention has particular reference to vaccum tanks comprising an upper suction—or float—chamber communicating, through a valve-controlled passage, with a lower supply-chamber having a gravity discharge to the carbureter. In this particular type of vacuum tank, the float-chamber has a fuel intake for connection to the main storage tank, and a suction port which is controlled by a float arranged within the upper chamber.

The main objects of this invention are to provide a vacuum tank of the aforesaid type having an improved construction and arrangement of the valve controlling communication between the suction- and supply-chambers; to provide a valve of the above character which is removably supported by an improved mounting in position to be readily accessible for the purpose of inspection and cleaning and to permit its replacement if desired; and to provide a vacuum tank of the aforesaid type wherein the valve between the two chambers is liquid sealed so as to prevent the passage of air from the supply-chamber to the float-chamber.

Illustrative embodiments of this invention are shown in the accompanying drawings, wherein:

Figure 1 is a central vertical section of a vacuum tank, showing one form of a trap valve embodying this invention for controlling communication between the two chambers.

Figure 2 is an enlarged fragmentary section of the lower part of the tank, showing a modified form of trap valve.

Figure 3 is a view similar to Figure 2, showing another form of trap valve.

Figure 4 is a view similar to Figure 2, showing the preferred form of trap valve embodying this invention.

In the form shown, the vacuum tank comprises a casing which is formed to provide an upper suction-chamber and a lower supply-chamber communicating with each other through a passage controlled by a trap valve. The general construction of the tank is similar to that shown in my copending application, Serial No. 599,066, filed November 4, 1922. The present invention relates particularly to an improved construction and arrangement of the trap valve which is opened by its own weight so as not to be dependent for its operation upon the gravity flow of the liquid fuel from the suction-chamber to the supply-chamber.

Referring to the drawings, the vacuum tank comprises a cylindrical casing 1, having a transversely disposed partition wall 2, which divides the casing into an upper suction-chamber 3, and a lower supply-chamber 4, communicating with each other through a liquid passage formed by an axially-arrange tube 5 extending downwardly from the partition.

The casing 1 includes a detachable head 6, having a fuel intake 7 for connection with the main supply-tank, not shown, a suction port 8 for connection to a suitable source of suction, such as the intake manifold of the engine, and an air inlet 9. Suspended from the head 6, is a saddle comprising a strap 10 and a pair of side rods, not shown. Slidably supported on the strap 10, is a float 11, having a central stem 12, the upper end of which forms a valve 13 for controlling the suction port 8. Seated in the air inlet 9 is a valve in the form of a vertically movable pin 14 for opening and closing the suction-chamber 3 to the atmosphere. The pin 14 is normally held closed by its own weight, and extends downwardly so as to be adapted to be lifted away from its seat by the float, when the latter is moved upwardly by changes in the level of the liquid in the suction-chamber. Mounted in the air inlet 9, above the valve 14, is a vent plug 15.

The supply-chamber 4 communicates with the air inlet 9 through a vent pipe 16, so as to be constantly under atmospheric pressure. Gravity discharge of the liquid from the supply-chamber 4 to the carbureter is provided through a discharge outlet 17 formed in the bottom of the casing. The casing is also provided with a pet cock 18, through which a small quantity of the fuel may be conveniently drained for various uses, if desired. Formed in the bottom of the casing 1, is a central opening 19, which is threaded to receive a cup-shaped receptacle 20, forming a well surrounding the lower end of the tube 5 and adapted to be constantly filled with a supply of the liquid fuel, so as to form a liquid seal for the trap valve. The receptacle 20 also serves as a cleaning well to catch any sediment which might pass through the tube 5.

In the form shown in Figure 1, the trap valve comprises a disk 21, arranged to seat against the lower end 22 of the tube 5, for closing communication between the two chambers when the suction port 8 is open during the operation of the suction producing means. The disk 21 is loosely supported in a plane at right angles to the axis of the tube 5 by a clip 23, having lugs 24 which detachably engage an annular groove 25 formed in the tube 5.

In the forms shown in Figures 2 and 4, the trap valve includes a cup-shaped element 26, which is threaded for engagement with the lower end of the tube 5. The element 26 is provided with a perforated bottom part 27, in which is mounted a pin 28 for slidably supporting a valve 29 which seats against the lower face of the bottom part 27. The perforations in the bottom part 27 are arranged so that the suction on the valve 29 is equally distributed over the surface of the valve.

In the form shown in Figure 3, the seat of the trap valve is formed on a sleeve 30, which is threaded for engagement with the tube 5. The valve 31 is loosely supported by a perforated cup-shaped hanger 32, which is threaded for engagement with the sleeve 30.

In operation, when a partial vacuum is produced in the suction-chamber 3, the trap valve is drawn upwardly against its seat to close communication between the two chambers, and liquid fuel is drawn into the suction-chamber 3, through the inlet 7. When the liquid reaches a predetermined level in the chamber 3, the valve 13 closes the suction port 8, and the float simultaneously lifts the atmosphere valve 14 away from its seat. When the suction-chamber 3 is opened to the atmosphere, the trap valve drops, due to its own weight, and the liquid fuel discharges into the supply-chamber and well 20. When the float 11 falls, the atmosphere valve 14 is closed and the suction port 8 is again opened. The relative arrangement of the trap valve and its mounting, permits the valve to move in a straight line movement axially of the suction-passage, and the suction is equally distributed over the surface of the valve.

Although but certain specific embodiments of this invention have been herein shown and described, it will be understood that some of the details of the constructions shown, may be altered or omitted without departing from the spirit of this invention as defined by the following claims:

I claim:

1. In a vacuum tank having a float control suction chamber operable by engine suction, fuel inlet means and suction conduit means and valve ports for said fuel inlet and suction means and means controlled by a float in said suction chamber for alternately opening and closing said ports, a supply chamber located below said suction chamber and having a communication to a carburetor, a well detachably secured to the bottom wall of said supply chamber, a valved tube connection between said suction chamber and said well and extending through said supply chamber, a normally open valve for said tube adapted to be closed by the influence of suction in said suction chamber.

2. In a vacuum tank adapted to raise fuel from a low level main supply tank by influence of engine suction having an upper suction chamber with float controlled valve means for alternately subjecting the interior thereof to the influence of engine suction and atmospheric pressure, a supply chamber and a well detachably secured to the bottom of said supply chamber, a discharge tube from the bottom of said suction chamber that passes through said supply chamber and into said well, and a normally open valve adapted to form a closure for said discharge tube when the said suction chamber is under the influence of engine suction, said well being adapted to overflow into said supply chamber.

3. A vacuum tank embodying float controlled valve means for raising fuel from a low level tank under the influence of engine suction; comprising an upper suction chamber containing the valves, float control mechanism and connections to engine suction means and fuel supply means, a supply receptacle below the said suction chamber, a well member detachably secured to the lower wall of said supply receptacle, a discharge tube connected to the lower wall of said suction chamber and extending entirely through said supply receptacle and terminating in said well, a normally open valve for the said discharge tube with means for holding said valve in proper relation to the end of said discharge tube that it may close said discharge tube under the influence of a partial vacuum in said suction chamber.

4. In a vacuum tank, an upper pumping chamber having valves controlling communications with suction source, fuel supply source and with the atmosphere, float means for controlling said valves, a lower reservoir chamber below said pumping chamber, a sediment well detachably secured to the bottom of said lower reservoir chamber and adapted to overflow into it, and a discharge tube member from the pumping chamber through the lower reservoir chamber and terminating in a normally open valved end within said sediment well, comprising a gravity conduit for contents of the said pumping chamber when said pumping chamber is not under the influence of suction.

5. A vacuum tank comprising a suction chamber having a fuel inlet and a suction port, means controlled by the level of the fuel in said suction chamber for alternately opening and closing said suction port, a supply chamber located in position to receive liquid from said suction chamber, a tube extending downwardly into said supply chamber to form a liquid passage providing communication between said chambers, a cup-shaped element detachably secured to the lower end of said tube and having a perforated bottom part, the lower face of said bottom part forming a valve seat, a valve coacting with said seat for controlling said passage, and a pin on said bottom part for slidably supporting said valve, said valve being normally held open by its own weight and as guided by said pin being movable axially of said passage for opening and closing communication between said chambers.

6. A vacuum tank comprising a casing formed to provide an upper suction chamber and a lower supply chamber located in position to receive liquid from said suction chamber, said suction chamber having a fuel inlet and a suction port, means for alternately opening and closing said suction port, a cup-shaped receptacle detachably secured to the lower end of said casing in communication with said supply chamber and arranged to be constantly filled with a supply of liquid fuel, a tube extending downwardly into said supply chamber and forming a liquid passage providing communication between said chambers, a cup-shaped element detachably secured to the lower end of said tube and formed to provide a valve seat, a valve coacting with said seat, and a pin on the bottom of said cup-shaped element for slidably supporting said valve, said valve being normally held open by its own weight and as guided by said pin being movable axially of said passage for opening and closing communication between said chambers, said valve and valve seat extending downwardly into said receptacle so as to be sealed by the liquid therein.

7. In a fuel feed tank of the type described, a casing having suction and supply chambers, a removable, elongated sediment trap and priming well extending through one wall of the supply chamber, a pipe opening at one end into the suction chamber and terminating at its opposite end within the said well, and a valve for closing the end of the pipe within the well.

8. In a fuel feed tank of the type described, a casing having suction and supply chambers, a removable, elongated sediment trap and priming well extending through one wall of the supply chamber, a pipe opening at one end into the suction chamber and terminating at its opposite end within the said well, a valve for closing the end of the pipe within the well, and means supporting the valve in proximity to the end of the pipe.

9. In a vacuum tank adapted to raise fuel from a low level under the influence of engine suction, a pumping chamber having float controlled valve means for subjecting the interior thereof alternately to the suction influence and to atmospheric pressure, a reservoir chamber, a removable sediment well, a vertical tube member forming a discharge communication from the said pumping chamber to said removable sediment well and through said reservoir chamber, a valve seat on the lower end of the vertical tube member and a co-acting normally open valve adapted to restrict flow in said vertical tube to a downward direction.

Signed at Chicago this 25 day of Nov. 1922.

HARRY G. RITCHEY.